July 1, 1924. 1,499,363
E. G. GOODELL
PROCESS FOR EXTRACTING CERTAIN VALUABLE CONSTITUENTS, AS BY-PRODUCTS,
FROM THE COOKING LIQUORS DERIVED FROM THE PRODUCTION OF WOOD PULP
TO BE CONVERTED INTO PAPER
Filed Oct. 23, 1922
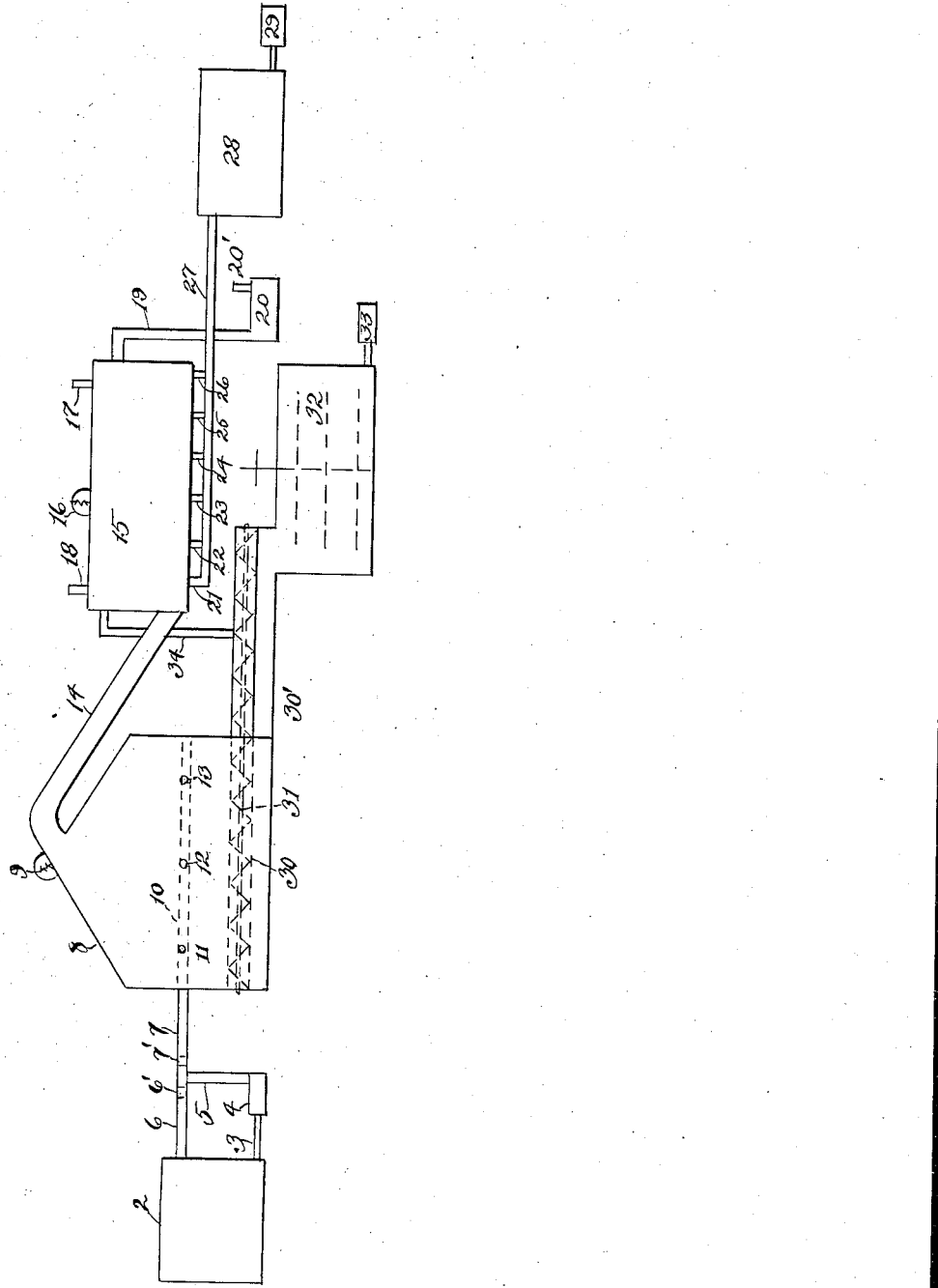
Inventor:
Edward G. Goodell Patented July 1, 1924.

1,499,363

UNITED STATES PATENT OFFICE.

EDWARD G. GOODELL, OF STEVENS POINT, WISCONSIN.

PROCESS FOR EXTRACTING CERTAIN VALUABLE CONSTITUENTS, AS BY-PRODUCTS, FROM THE COOKING LIQUORS DERIVED FROM THE PRODUCTION OF WOOD PULP TO BE CONVERTED INTO PAPER.

Application filed October 28, 1922. Serial No. 597,517.

*To all whom it may concern:*

Be it known that I, EDWARD G. GOODELL, a citizen of the United States, residing at Stevens Point, Portage County, Wisconsin, have invented a new and useful process for extracting certain valuable constituents, as by-products, from the cooking liquors derived from the production of wood pulp to be converted into paper, of which the following is a specification.

In the production of wood pulp by the well known soda-sulphate processes, the wood is subjected to pressure cooking in various sodium compound solutions whereby the fibrous matter is separated from the lignins, gums, rosins and various incrusting substances that are unsuitable for working into paper. After such cooking the cooking liquors, or "black liquors" as they are commonly known, are separated from the pulp. Out of a given quantity of dry wood about fifty per cent of pulp is obtained, the remaining 50 per cent being contained for the most part in the black liquor, which holds in suspension, solution or combination a variety of solids, liquids and gases, according to the kind of wood used, including, for instance, substances like acetone, rosin, oils, tar, alcohol, etc. These black liquors have heretofore been subjected to certain processes of burning and melting to recover therefrom wood-cooking chemicals or sodas, but such recovery processes have destroyed and consumed as fuel the valuable by-products which the present invention is designed to conserve.

The purpose of my new process is, therefore, to provide means whereby not merely the above-named cooking chemicals or sodas may be recovered, but which will also enable the recovery of the many and valuable by-products referred to. Attempts heretofore made to distil out of these black liquors said by-products have been found impracticable for the reason that said black liquor is a substance which foams badly when in bulk exposed to heat. I have overcome the obstacles in former distilling processes by concentrating the black liquor to a density of from about 30 to 40° Baumé (basis 60° Fahr.), heating and then spraying said black liquor, or fluid solution, into a retort or chamber of sufficiently high temperature to atomize, vaporize, or render into a gaseous state the volatile portions of the liquor, then conducting the latter into a condensing chamber to be condensed to liquid or solid form by any of the commonly approved appliances; and collecting the residue, precipitates, solids, or heavier portions to be separately treated; all within connected and air-tight chambers, receptacles or inclosures. The condensed gases or vapors are subsequently separated, or purified, by fractional distillation or through other usual processes, as is also the residue or heavier materials.

In the accompanying drawing, which diagrammatically illustrates one form of apparatus adapted to carry out my invention, 2 represents a black liquor storage and heating tank from which a pipe or conduit 3 leads to a pressure pump 4. From the latter a pipe 5 leads into a pipe with a return portion 6 provided with a suitable pressure or check valve 6' and a portion 7, with a similar valve 7', leading into a retort 8 provided with a safety cap, or valve, 9. Within the retort 8 the pipe, or conduit, 7 has an extension 10 which is suitably perforated or provided with nozzles or other spraying devices 11, 12 and 13. The retort 8, as well as the chambers or conduits connected therewith, is suitably insulated and made air-tight so as to prevent the accidental escape of fumes, gases or vapors therefrom.

The rarified contents of the retort 8 are conveyed through a pipe or conduit 14 into a condensing chamber 15 provided with a safety cap or valve 16. This condensing chamber may be equipped with any of the well known means for condensing, such as pipes or coils through which cooling water is circulated and against which the gases are condensed by surface contact. The numeral 17 represents the inlet and 18 the outlet for such a pipe system or coil to be connected with any suitable source of supply and circulating force.

The condenser 15 is, through a pipe or conduit 19, connected with a pump 20 which discharges through a pipe 20', said pump 20 being a vacuum pump for relief of non-condensable gases and maintaining vacuum in the retort and condenser when desired. The bottom of the condenser 15 is provided with multiple outlets 21 to 26 inclusive, which lead into a pipe or conduit 27 which discharges into a receiving tank 28 for the condensates. The receiving tank is provided with a pump 29 which delivers said condensates to any suitable point for fractional distillation and purifying apparatus.

The bottom portion of the retort 8 is open to a conveyer-casing 30 within which is mounted and operated a spiral, drag, or other suitable, conveyer 31 for discharging from said retort such residue as charcoal, carbon, the sodas to be re-employed for the making of wood pulp, etc. The casing 30 and its conveyer leads into a dissolving tank 32, the portion of the casing 30 which projects beyond the retort 8 being separately indicated by the numeral 30', said sections 30 and 30' being adapted for progressive distillation by varying the intensities of heat applied to different portions thereof, the products of distillation varying with the temperatures. The dissolving tank contains water or other suitable dissolving fluid and is connected with a pump 33 which conveys the pulp-making sodas or other contents to the place where the ordinary recovering processes take place.

Heat is applied to the retort 8 and its conveyer sections 30 and 30' in any suitable manner. For the section 30' of the conveyer-casing may be provided a zone of higher temperature than that to which the retort 8 is subjected, to distill off products which would not be separated from the body of substances in the retort 8. The section 30' is therefore separately placed in communication with the interior of the condenser 15 through a conduit 34.

As the fluid compound, or black liquor, is sprayed into the retort 8 through the action of the pump 4, residue such as carbon carrying the sodium compounds, falls to the bottom of the retort and is discharged therefrom by the conveyer 31 into the dissolver tank 32 filled with water or weak liquor, which dissolves out from the residue the sodas contained therein. When this solution of sodas reaches the proper density the contents of the dissolver tank 32 are discharged by means of the pump 33 to the further customary steps which takes place in the recovery plant common to all mills using the soda or sulphate process of pulp manufacture.

Among the gases produced by the destructive distillation of these black liquors are usually some non-condensable gases. These are drawn from the condenser by means of the pump 20 and discharged through 20' to any point desired. These non-condensable gases are frequently highly combustable and may be used for heating purposes in connection with the present process, or otherwise. In the present connection the heat is applied to the outer walls or shell of the retort 8 and to the conveyer casing by direct contact with the flames of oil, gas, or other fuel, or the interior of the retort may be heated in any other suitable manner.

I claim as my invention—

1. The process of distillation which consists of spraying a fluid substance into a highly heated retort whereby the volatile portions of said substance are rendered into vaporous or gaseous form and the non-volatile portions are precipitated as residue.

2. The process of distillation which consists of vaporizing a spray of matter to precipitate its non-vaporous portions and condensing the vapors into liquid form.

3. The process of distillation which consists of vaporizing finely divided portions, precipitating the solid or non-gaseous parts thereof while continuously under confinement within substantially air-sealed inclosures.

4. The process of distillation which consists of subjecting within an inclosure a sprayable substance to vaporizing heat to separate the volatile from the non-volatile portions of said substance, precipitating the latter in one body and condensing the vapors or gases of the volatile portions into a separate body.

5. The process of distillation which consists of spraying and simultaneously heating matter to render its volatile portions into gases or vapors and causes its non-volatile portions to be separately precipitated, and condensing the gases or vapors into liquid form.

6. The process of distillation which consists of spraying and simultaneously heating a fluid sufficiently to change its volatile portions into vaporous or gaseous form, precipitate its non-volatile portions as residue, and subjecting the vaporous or gaseous form to a condensing process.

In testimony whereof I have hereunto signed my name.

EDWARD G. GOODELL.